Sept. 23, 1958 C. B. LEACH 2,853,063
ENGINE WITH REVERSIBLE HEADS, COUPLINGS AND GASKETS
Filed July 12, 1954 3 Sheets-Sheet 2

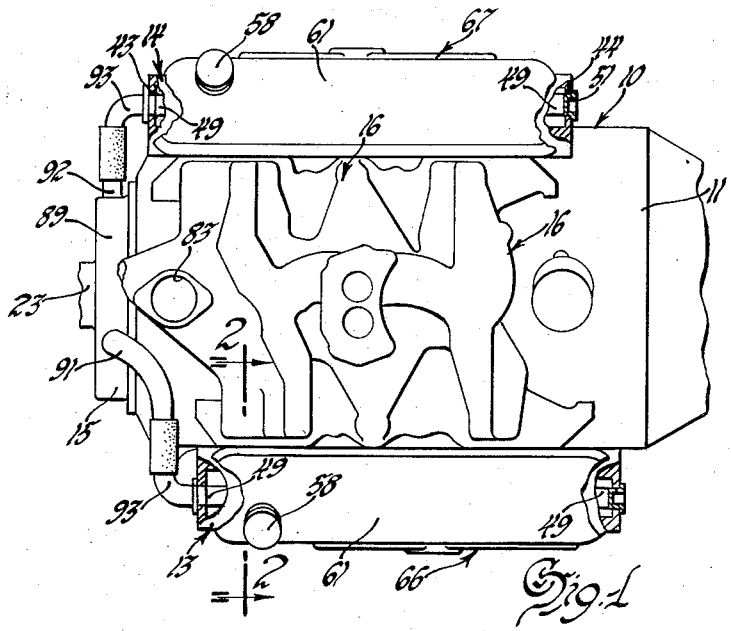

INVENTOR
Clayton B. Leach
BY
L. D. Bursh
ATTORNEY

Sept. 23, 1958     C. B. LEACH     2,853,063
ENGINE WITH REVERSIBLE HEADS, COUPLINGS AND GASKETS
Filed July 12, 1954     3 Sheets-Sheet 3
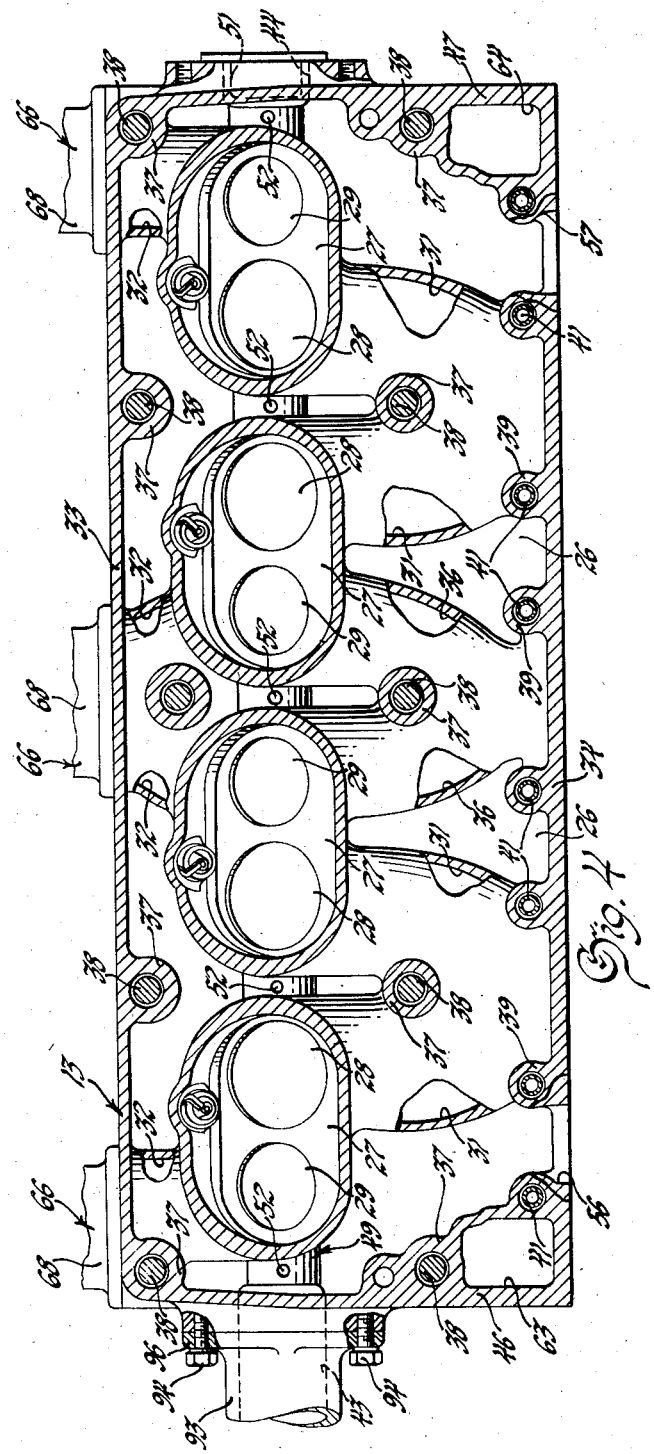
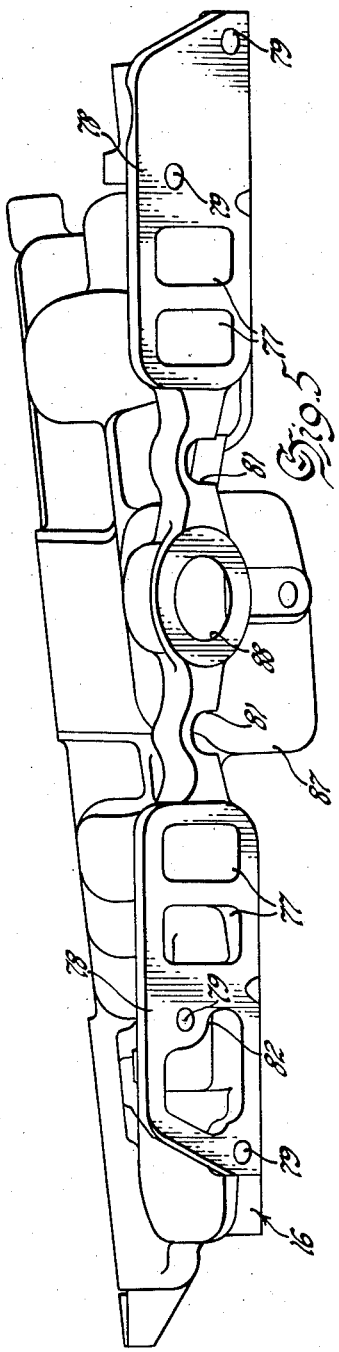
INVENTOR
Clayton B. Leach
BY
ATTORNEY

United States Patent Office 2,853,063
Patented Sept. 23, 1958

2,853,063

ENGINE WITH REVERSIBLE HEADS, COUPLINGS, AND GASKETS

Clayton B. Leach, Pontiac, Mich., assignor to General Motors Corporation, Detroit, Mich., a corporation of Delaware Application July 12, 1954, Serial No. 442,737

6 Claims. (Cl. 123—41.82)

This invention relates to internal combustion engines and has particular relation to a V type engine in which various parts of the engine are reversible so that only one kind of each is required for an engine employing more than one of each.

Heretofore, in the construction of V type engines, it has been necessary to make two or more of many parts which were very similar but not identical. Engine heads, for example, have been similar, intake manifold gaskets have been similar and water connections and conduits have been similar. However, it has been necessary to make right-hand and left-hand heads, manifolds, gaskets, conduits and connections. This requires excessive tooling, excessive inventory of parts for both production and service and greatly adds to the cost of building engines.

It is now proposed to construct a V type engine in which the two heads for a single engine are of identical design. The heads are made of symmetrical design from one end to the other so that the single head may become a right-hand head or a left-hand head for the same engine merely by reversing the head lengthwise. The heads are also provided with cooling liquid supply or distribution conduits which are identical. It is also proposed to employ the same manifold gasket between the heads and the inlet and water manifold for the engine. Such a gasket can be used on either side of the engine by reversing the gasket lengthwise and placing the same sides of the gasket in contact with the heads and the adjacent manifold surfaces. It is also proposed to provide a water or cooling liquid circulating pump which is so designed that the same coupling may be employed on either side of the engine to connect the outlet passages from the pump to the inlet openings in the heads.

In the drawing:

Figure 1 is a plan view diagrammatically illustrating various features of an internal combustion engine embracing the principles of the invention.

Figure 2 is a fragmentary cross sectional view of the engine through one of the engine heads. Figure 2 is taken substantially in the plane of line 2—2 on Figure 1.

Figure 4 is a longitudinal sectional view through one of the engine heads as the latter might appear substantially in the plane of line 4—4 of Figure 2 looking in the direction of the arrows thereon.

Figure 5 is a side elevational view of the inlet and cooling liquid manifold structure embraced in the engine disclosed by the preceding figures.

Figure 3:
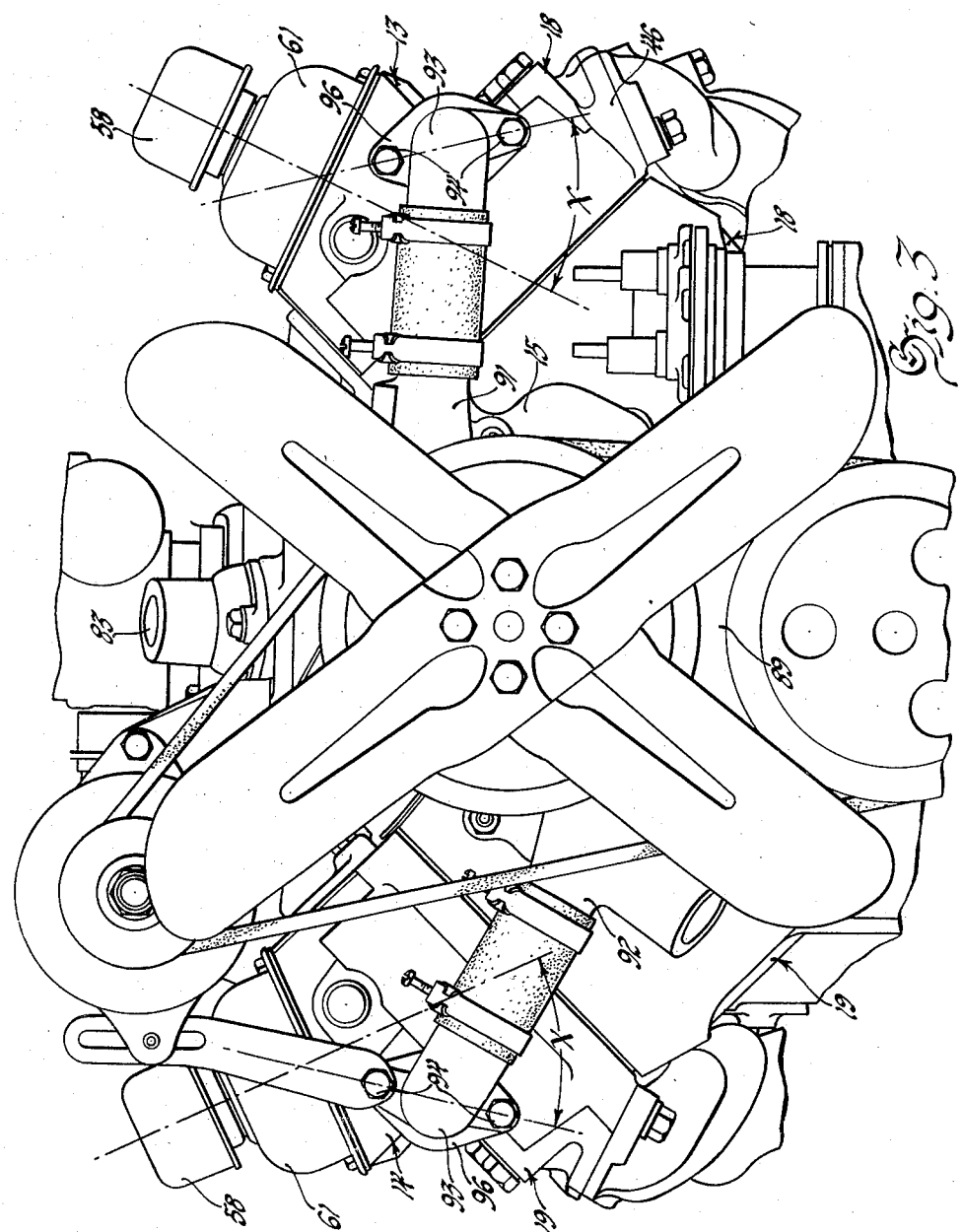
Figure 3 is a front end view on a reduced scale of the engine disclosed by Figure 1 and illustrating the water pump and the water pump connections to the engine heads.

The engine 10 embracing the invention has an engine frame 11 which includes a cylinder block 12, heads 13 and 14, a fuel mixture inlet and cooling liquid outlet manifold 16 and a cooling liquid circulating pump 15. The block 12 has rows of cylinders 17 therein which are arranged in banks of cylinders 18 and 19 disposed in obliquely disposed relation to one another. The cylinders 17 receive reciprocable pistons 21 adapted to be connected to the crankshaft 22 of the engine by connecting rods 23. The banks of cylinders 18 and 19 have cooling liquid cavities 24 formed therein for cooling the pistons 21 and the cylinders 17. The heads 13 and 14 have cooling liquid cavities 26 therein for cooling the combustion chambers 27, the inlet valves 28, the exhaust valves 29 and the inlet and exhaust passages 31 and 32, respectively, for each of the cylinders 17. In the present instance the exhaust passages 32 extend from the exhaust ports for each exhaust valve 29, transversely across the cavity 26 and terminate in exhaust openings formed in the outside walls 33 of the heads 13 and 14. In the present instance there are separate exhaust passages 32 for each of the two end cylinders of each bank of cylinders and there are separate exhaust passages 32 for each of the two middle cylinders for each bank of cylinders for the engine. However, the separate passages 32 for the middle cylinders merge in a single outlet in each of the side walls 33. In the present instance by-pass passages 36 for the exhaust passages 32 for the two middle cylinders of each bank of cylinders also extend transversely across the heads 13 and 14 to the inner walls 34 of the heads 13 and 14 and there terminate in a single outlet opening in the side wall 34. The exhaust passages 32 and the inlet passages 31 and the by-pass passages 36 all terminate in openings in the side walls 33 and 34 which are equi-distant from or symmetrically with respect to median planes extending transversely through the engine heads from the upper to the lower walls thereof and between the two intermediate cylinders of each bank of cylinders of the engine and the combustion chambers 27 therefor.

The heads 13 and 14 also are provided with tubular columns 37 projecting through the cavities 26 from the upper to the lower walls of the heads and through which bolts 38 are adapted to project into threaded openings formed in the blocks 18 and 19 for securing the heads 13 and 14 in position upon the blocks. Each of the bolts 38 and the columns 37 are located at equal distances on opposite sides of or symmetrically with respect to the median planes of the heads 13 and 14. The heads 13 also have columns 39 projecting from the upper to the lower walls thereof and adjacent the inside walls 34. The columns 39 have openings therethrough for receiving push rods 41 for operating the valve operating mechanisms 42 for the inlet and exhaust valves 28 and 29 for each cylinder 17 of the engine. The columns 39 and the push rods 41 are all located equal distances on opposite sides of or symmetrically with respect to the median planes of the heads 13 and 14.

The combustion chambers 27, the inlet and exhaust valves 28 and 29 and the parts of the lower walls 48 which are adapted to cover the ends of the cylinders 17 also are arranged equal distances on the opposite sides of or symmetrically with respect to the median planes of the heads 13 and 14.

The heads 13 and 14 also have aligned openings 43 and 44 extending transversely through the front and rear walls 46 and 47 thereof. The opening 43 in the front wall of each head is for the purpose of supplying cooling liquid to the cooling liquid cavities 26 in the heads. The openings 43 and 44 also are arranged equal distances on opposite sides of and symmetrically with respect to the median planes of the heads 13 and 14.

The openings 43 in the front walls 46 of the heads 13 and 14 are adapted to have secured therein the enlarged ends of cooling liquid supply or distribution conduits 49. The conduits 49 extend throughout the length of the heads 13 and 14 and above the combustion chambers 27 and above the inner extremities of the exhaust passages 32, the inlet passages 31 and the by-pass passages 36 and terminate adjacent the openings 44 in the rear walls 47 of the heads. The openings 44 and the adjacent ends of the conduits 49 are closed by sheet metal plugs 51 which are adapted to be pressed into the openings 44. The openings 43 and 44 are identical in size and shape so that the enlarged ends of the conduits 49 may be pressed into either of the openings 43 or 44. Likewise the plugs 51 may be inserted in either of the openings 43 or 44 in such manner as to close the openings and the adjacent ends of the conduits 49.

The cooling liquid supplied to the conduits 49 is distributed throughout the length of the conduits by spaced openings formed throughout the length of the conduits and in any suitable manner. In the present instance the openings are formed on opposite sides of each inlet and exhaust passage 31 and 32 and over the exhaust passages 32. Certain of the openings in the conduits 49 are indicated by the numerals 52. The cooling liquid supplied to the cavity 26 by the conduits 49 is exhausted from the heads 13 and 14 through openings 53 formed in the lower walls 48 of the heads 13 and 14 and in the upper walls 54 of the cylinder blocks 18 and 19. The cooling liquid so supplied is also exhausted through openings 56 and 57 in the side walls 34 of the heads and adjacent the end walls of the heads. The openings 53 and 56 and 57 are all disposed equal distances on opposite sides of or symmetrically with respect to the median planes of the heads 13 and 14.

The interior ventilation system for the engine involves introducing air through intake devices 58 to the compartments 59 within the covers 61 for the valve operating mechanisms 42 for the valves 28 and 29 for each cylinder 17 of the engine. The air so admitted to the compartments 59 is supplied to the camshaft gallery 62 of the engine through openings 63 and 64 adjacent the front and rear walls 46 and 47 of the heads and the inner side walls 34 thereof. The passages 63 and 64 extend through the cooling liquid cavities 26 in the heads from the upper to the lower walls of the heads. The passages 63 and 64 are located at equal distances on opposite sides of or symmetrically with respect to the median planes of the heads 13 and 14.

It will be apparent that the heads 13 and 14 can be reversed on the engine 10 and that every part of the heads will always be in the same position with respect to the cylinders 17 of the engine. It is possible therefore to manufacture a single head for each bank of cylinders of the engine.

It is also apparent that the conduits 49 may be reversed in the heads 13 and 14 and that either of the openings 43 or 44 in the heads may serve as the inlet opening for supplying cooling liquid to the conduits 49. It is therefore possible to have a single design for the conduits 49.

The outer side walls of the heads 13 and 14 are adapted to have exhaust manifolds 66 and 67 secured thereto. The manifolds 66 and 67 have inlet passages 68 formed therein which are adapted to communicate with the exhaust passages 32 in the heads 13 and 14 on either side of the engine 10. The exhaust manifolds 66 and 67 also may be made reversible if this is desired so that only one inlet manifold is required for use on either side of the engine 10.

The inlet passages 31, of which there is one for each cylinder 17 of the engine, open through the inside walls 34 of the heads and are adapted to communicate with mixture supply passages 77 formed in the inlet manifold 16 for the engine 10. The mixture supply passages 77 terminate in side walls 78 extending along each side of the manifold 16 and adapted to be secured to the side walls 34 of the heads 13 and 14 by bolts adapted to project through openings 79 and recesses 81 formed in the side walls 78. The bolts are adapted to engage threaded openings formed in the inner side walls 34 of each of the heads 13 and 14. The threaded openings in the inner side walls 34 of the heads 13 and 14 are all located the same distances from and symmetrically with respect to the median planes of the heads 13 and 14.

The manifold 16 has a cooling liquid outlet passage 82 formed transversely thereacross at the front end thereof. The passage 82 also opens through the side walls 78 of the manifold 16 on opposite sides of the manifold 16 and in such position that the opposite ends of the passage 82 communicate with the outlet openings 56 at the front of each of the heads 13 and 14. The passage 82 has a discharge passage 83 adjacent the middle thereof for discharging cooling liquid from the heads 13 and 14 through the passage 82 and into the upper part of the radiator of the engine. It will be noted that the side walls 78 of the manifold 16 project rearwardly of the rearwardly disposed supply passages 77 to provide for the openings 79 at the rear of the manifold for receiving the bolts for securing the manifold to the heads 13 and 14. The bolt holes 79 in the side walls 78 at the rear of the manifold 16 are directly opposite the outlet passages 57 in the rear ends of the side walls 34 of the heads 13 and 14. The side walls 78 may be closed over the openings 57 thus preventing this flow of cooling fluid from the openings 57. Gasket means 86 may be inserted between the side walls 78 of the manifold 16 and the side walls 34 of the heads 13 and 14. The gaskets 86 may be cut out opposite the outlet openings 56 and 57 in the heads 13 and 14 to permit the flow of cooling fluid from the openings 56 when the gasket are reversed. The bolts projecting through the openings 79 at the rear ends of the side walls 78 of the manifold 16 will hold the gaskets 86 firmly in position over the openings 57. The gaskets 86 are otherwise provided with openings permitting the openings 56 in the heads 13 and 14 to communicate with the cooling liquid passage 82 in the manifold 16 and with openings permitting the inlet passages 31 in the heads 13 and 14 to communicate with the supply passages 77 in the manifold 16. If so desired the manifold 16 may be provided with manifold heating means indicated at 87. The manifold heating means 87 may by supplied with exhaust gas by a heating passage 88 extending transversely across the manifold 16 and having opposite ends terminating in the side walls 78 in such position as to communicate with the single outlet opening in each of the walls 34 which communicates with the by-pass passages 36 formed in the heads 13 and 14.

The heads 13 and 14 may be supplied with cooling liquid by a pump 15 located within the upper part of the timing chain cover 89. The pump 15 may have tangentially disposed outlet passages 91 and 92 leading from the discharge chamber or chambers thereof in diametrically opposed relation to one another. It will be noted that the outlet passages 91 and 92 are disposed in different angular relation to one another with respect to the vertical plane of the engine 10. The outlet passage 91 extends substantially horizontally toward the inlet opening 43 in the head 13 whereas the outlet passage 92 is directed obliquely upwardly toward the inlet opening 43 in the head 14. Notwithstanding this difference in the angular positions of the outlet passages 91 and 92 it is proposed to provide angular couplings 93 that are identical in design and that may be secured to either of the heads 13 and 14 by diametrically opposed pairs of bolts 94. The bolts 94 are adapted to project through diametrically opposed openings in flanges 96 of the couplings 93 and into threaded openings formed in the front walls 46 of the heads 14. The openings in the flanges 96 are so arranged that the couplings can be rotated from one position to another and the same set of openings in the flanges 96 will be aligned with the openings in the front walls 46 of either of the heads 13 and 14. To accomplish such purpose the openings in the front walls 46 have been positioned at an angle X beyond the planes of the axes of the cylinders in each bank of cylinders 18 and 19. Corresponding openings have been provided in the rear walls 47 of each of the heads 13 and 14. It will be apparent that when the heads 13 and 14 are reversed that the angle X will be the same on each side of the engine except that the angles will be reversed with respect to the plane of the axes of the cylinders of each bank of cylinders. It will be apparent that when the couplings 93 are rotated about the axis of the openings 43 in the front walls of the heads 13 and 14 that the opposite ends of the couplings will correspond to the angle of either of the outlet passages 91 or 92 leading from the pump 15.

It will be apparent that only one head, one manifold gasket, one cooling liquid inlet conduit and one inlet coupling design may be required to supply two or more of each of such items for each engine manufactured.

I claim:

1. A reversible head for engines having a plurality of aligned cylinders and having elongated inlet manifold means embodying spaced inlet manifold passage means extending along one side of said aligned cylinders and elongated exhaust manifold means embodying spaced exhaust manifold passage means extending along the opposite side of said aligned cylinders, and comprising an elongated body having a plurality of inlet passages formed transversely thereof and opening through one side wall of said body, there being one of said inlet passages for each of said cylinders and for each of said inlet manifold passage means, said elongated body also having a plurality of exhaust passages formed transversely thereof and opening through the opposite side wall of said body, there being one of said exhaust passages for each of said cylinders and for certain of said exhaust manifold passage means, said inlet and exhaust passages being formed in said body in symmetrical relation from the middle toward the opposite ends of said body, there being certain of said inlet and certain of said exhaust passages formed transversely of said body toward each of said opposite ends and remote from said middle of said body and opening through said side walls adjacent said opposite ends of said body, bolt passages formed in said body and extending between the upper and lower surfaces thereof for securing said body to said cylinders, said inlet passages and said exhaust passages and said bolt passages being arranged symmetrically in said body with respect to a transverse plane through said middle of said body and between said opposite ends.

2. A reversible head for engines as defined by claim 1 and in which certain of said exhaust passages formed transversely of said body also open through said one side wall of said body, said certain of said exhaust passages also being symmetrically arranged in said body with respect to said transverse plane through the middle of said body and between said opposite ends.

3. A reversible head for engines as defined by claim 1 and in which cooling liquid cavity means is formed in said body around said inlet and exhaust passages, there being cooling liquid inlet and outlet passage means formed in said body for supplying cooling liquid to an exhausting cooling liquid from said cooling liquid cavity means, said cooling liquid outlet passage means being parallel passages opening through one side wall of said body and adjacent said opposite ends of said body, either of said outlet passages being formed in said body to be disposed opposite closure means and the other being formed in said body to be disposed opposite cooling liquid outlet means when said head is installed on an engine, said outlet passages also being arranged symmetrically in said body with respect to said transverse plane through said middle of said body and between said opposite ends.

4. A reversible head for engines comprising an elongated body having transversely disposed exhaust passages formed therein and opening outwardly through one side wall of said body and transversely disposed inlet passages formed therein and opening outwardly through the opposite side wall of said body, a cooling liquid cavity formed in said body and extending around said exhaust passages, aligned cooling liquid inlet passage means communicating with said cooling liquid cavity and formed in opposite end walls of said body, parallel cooling liquid outlet passage means communicating with said cooling liquid cavity and formed in said body and opening through said opposite side wall of said body adjacent the opposite ends of said body, means closing certain of said cooling liquid passages when said head is installed on an engine, bolt passages formed in said body and extending between the upper and lower surfaces thereof for securing said body to an engine, said inlet passages and said exhaust passages and said cooling liquid inlet passages and said cooling liquid outlet passages and said bolt passages being arranged symmetrically in said body with respect to a transverse plane through the middle of said body and between the opposite ends of said body.

5. A reversible head for engines comprising an elongated body having inlet and exhaust passages formed therein and opening through opposite side walls of said body, and air circulation passages formed in said body and extending from the upper to the lower walls of said body and being formed in said body an equal distance from a mid-plane extending transversely through said body, said inlet and exhaust passages also being symmetrical with respect to said mid-plane.

6. A reversible head for engines as defined by claim 5 and in which said air circulation passages are adjacent the opposite end walls of said body and the same side wall of said body.

References Cited in the file of this patent

UNITED STATES PATENTS

| | | |
|---|---|---|
| 1,250,426 | Brush | Dec. 18, 1917 |
| 1,276,389 | Mason et al. | Aug. 20, 1918 |
| 1,335,990 | Short | Apr. 6, 1920 |
| 1,366,149 | Applin | Jan. 18, 1921 |
| 1,851,051 | Loeffler | Mar. 29, 1932 |
| 1,866,873 | Barbarou | July 12, 1932 |
| 2,027,847 | Victor et al. | Jan. 14, 1936 |
| 2,079,729 | Balfe | May 11, 1937 |
| 2,186,080 | Sheldrick | Jan. 9, 1940 |
| 2,257,631 | Wahlberg | Sept. 30, 1941 |
| 2,281,694 | Huber | May 5, 1942 |
| 2,434,038 | Ford | Jan. 6, 1948 |